Nov. 4, 1952  W. C. TINUS  2,617,094
OBJECT LOCATION SYSTEM
Filed March 30, 1945  4 Sheets-Sheet 1
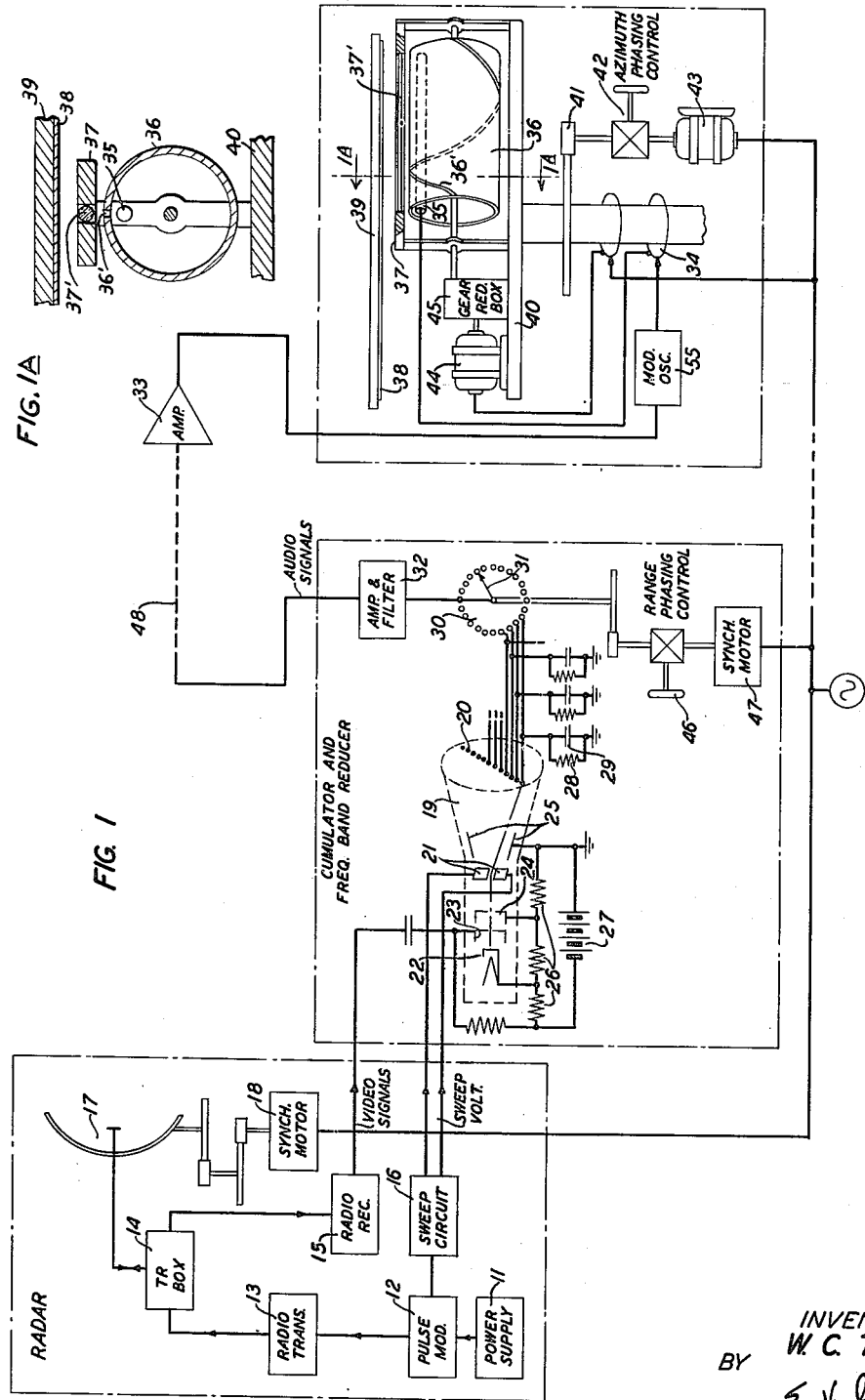
INVENTOR
W. C. TINUS
BY
E. V. Griggs
ATTORNEY Nov. 4, 1952          W. C. TINUS          2,617,094
OBJECT LOCATION SYSTEM
Filed March 30, 1945          4 Sheets—Sheet 2
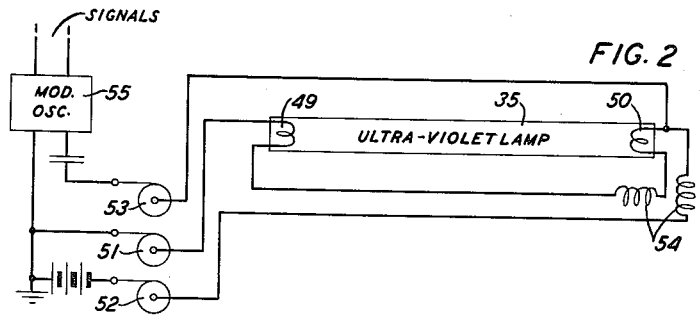
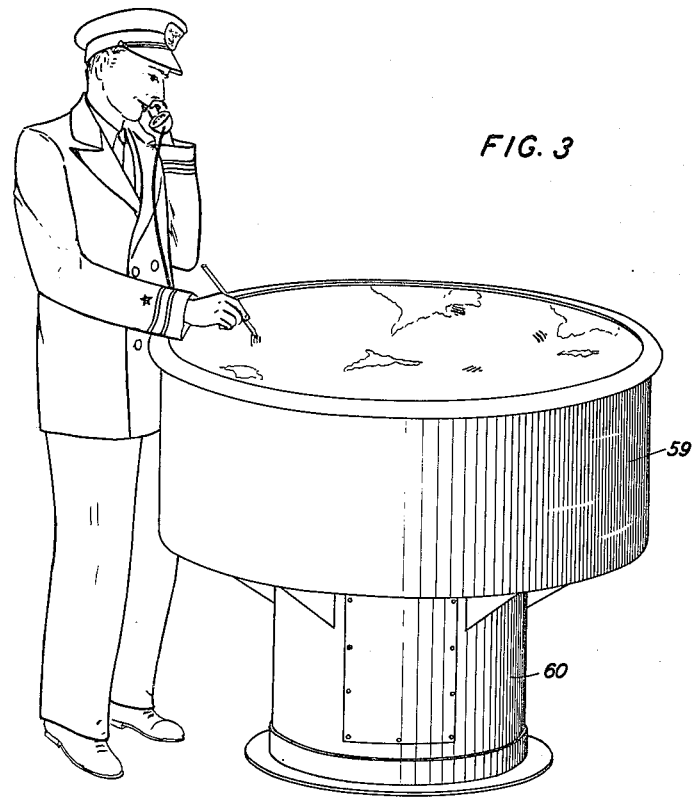
INVENTOR
W. C. TINUS
BY
E. V. Griggs
ATTORNEY Nov. 4, 1952

W. C. TINUS 2,617,094

OBJECT LOCATION SYSTEM

Filed March 30, 1945

INVENTOR
W. C. TINUS
BY
E. V. Griggs
ATTORNEY

Patented Nov. 4, 1952

2,617,094

UNITED STATES PATENT OFFICE 2,617,094

OBJECT LOCATION SYSTEM

William C. Tinus, Maplewood, N. J., assignor to Bell Telephone Laboratories, Incorporated, New York, N. Y., a corporation of New York Application March 30, 1945, Serial No. 585,668

6 Claims. (Cl. 343—11)

This invention relates to methods of and means for conveying automatically to a central station information collected by the pulse-echo method with respect to the location, and speed and direction of movement, of objects in a large exploratory area, as in harbor surveillance, or plane dispatching toward or from a large air field. In the specific illustrative embodiment disclosed herein this invention relates to an early warning radar system and particularly to that type of object location system in which the pulse-echo indications corresponding to the objects or targets lying in a large area are transmitted to a tactical or information center and there continuously recorded upon a large plotting table or board covered with the usual grid map of the area that is being scanned.

The particular object of the present invention is the provision of a system and apparatus that will cause the object or target reflections or echoes automatically to be converted into audio frequency impulses to be transmitted from the scanning radar to a remote tactical or information center and there automatically and continuously translated into visual indications at corresponding azimuth and range points on a large plotting surface so that they may be observed and noted by the operators attending the plotting board.

More specifically, the object of the present invention is to provide an automatic early warning system and large scale plan position indicator in which the azimuth and range of each target within the scanning field or exploratory area of the radar is indicated with sufficient accuracy to produce an intelligible visual track on a large diameter plotting table at the information center; in which the data transmitted are repeated at sufficiently short intervals so that the resulting track on the plotting table will indicate the target's course and speed after only a few minutes; and in which the azimuth and range of each target and its approximate course and speed will appear on the table no matter how many targets are within the scanning range of the radar antenna.

It has heretofore been customary to provide at an information center a plotting board covering a large exploratory area that is being scanned, and to transmit telephonically by spoken word to the operators stationed at the plotting board, to be marked on the board, target signals which appear upon a small video-frequency-operated oscilloscopic plan position indicator or upon a plurality of oscilloscopes, each one of which is receiving video frequency signals from a portion of the whole exploratory area. Such an arrangement is satisfactory if the targets simultaneously under observation are relatively few. But where there are many targets simultaneously under observation in the exploratory area, the spoken telephonic transmission of essential data to the information center gives rise to confusion, inaccuracy and delay.

The video frequencies involved in the transmission of pulse echoes from targets lying in the scanning beam and their reception at the scanning center are high, and may require a frequency band width extending as high as some hundreds of thousands of cycles per second. In the system of the present invention, however, it is not necessary to transmit such a broad band of frequencies to the plotting board at the information center. The transmission may be effected at telephonic or audio frequencies without sacrifice of any information that is essential or important in an early warning radar system. It is customary in radar systems to use a pulse repetition rate of several hundred per second. Each of the several hundred radiated pulses per second produces a trace on the receiving oscilloscope, and each of these traces registers, as a deviation in the form or brightness of the trace, the range of each of the targets lying in the path of the scanning beam. But it is not necessary that each of these many-times-repeated target indications be individually transmitted to the plotting board at the information center in order to convey the essential information with respect to the position, and the direction and rate of movement of the target. If the target signal is transmitted to the plotting board, for instance, only a few times instead of several hundred times per second, all of the essential requirements of an early warning radar system may be satisfied.

Briefly stated, the system of the present invention comprises; a radar station; a cumulator for storing the energy and reducing the frequency band width of the radar signals or pulse echoes received from targets in the whole exploratory area, so that energy received at a high frequency rate over high or video frequency circuits may be stored and relayed at a lower frequency rate over lower or audio frequency circuits; and an extended scale plotting board or table representing the whole area, which may be located in a position remote from the scanning radar antenna and persistently excited at each target point by the repeatedy relayed lower or audio frequency signals representing the higher or video frequency target signals stored in the cumulator. The elements of the system are kept in synchronism, as by interconnected synchronous motors, so that the azimuth scanning element of the plotter is rotated synchronously and in phase with the scanning antenna, and so that the range scanning element of the plotter is moved synchronously and in phase with the range scanning sweep of the cumulator.

Where an ordinary oscilloscope is used as the signal indicator for objects or targets lying within a certain narrow azimuthal interval or sector of an area, the pulse echo repetition rate is sufficiently rapid so that the slight fluorescent persistence of the material of the oscilloscope screen plus visual persistence produces the effect of continuity of display of the target indications lying along the range of the oscilloscope sweep. Where, as in the case of the present invention, the reflected energy of a succession of pulse echoes at video frequencies is stored and taken off at less frequent intervals in order to realize the advantages of transmission of the signals to a plotting table at an audio frequency rate, the effect of continuity of display of the target signals is accomplished by providing the under-surface of the large diameter extended scale plotting table with a coating of fluorescent or phosphorescent material the characteristics of which are such as to produce photoluminescence of relatively long persistence. The luminous persistence is sufficient to give the operator or operators at the plotting table time to mark on the table the signals of interest as they appear.

The photoluminescent under-surface of the plotting table is preferably excited by ultra-violet light. A radially extending member synchronized in its circumferential sweep with the azimuth sweep of the radar antenna is arranged to emanate ultra-violet light at any point along its length. The particular point at which ultra-violet light is effectively radiated to the photoluminescent coating of the plotting table is synchronized with the range scanning sweep of the element that distributes and stores the received target signals over the radial range of the azimuthal interval that is at the moment being scanned.

The invention will be more clearly understood by reference to the following description, taken in connection with the accompanying drawings forming a part thereof, in which:

Fig. 1 shows in schematic form an object location system embodying the principles of the present invention; Fig. 1A illustrating a fragmentary sectional portion to bring out the lens containing linear slot in mask 37;

Fig. 2 is a schematic diagram of a circuit which may be used for converting the target signal impulses received at the information center into ultra-violet light;

Figure 4:
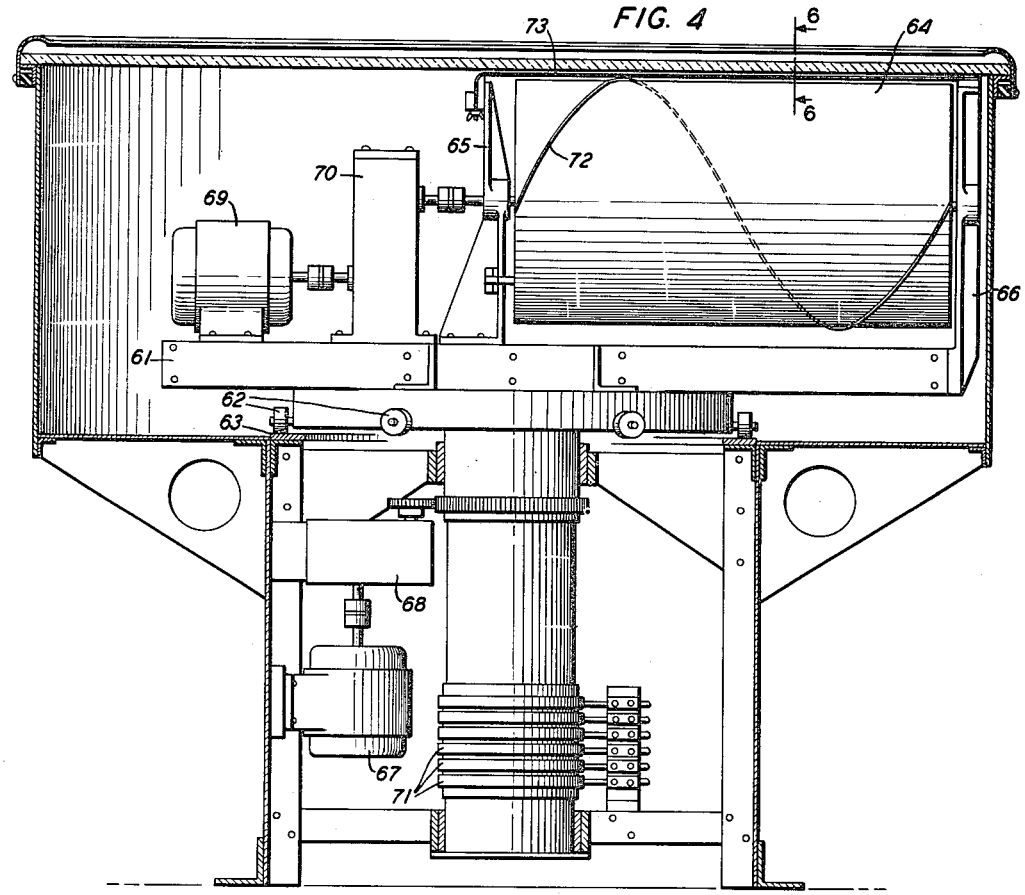
Figure 6:
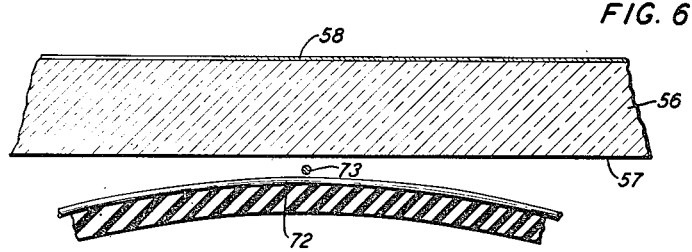
Figure 5:
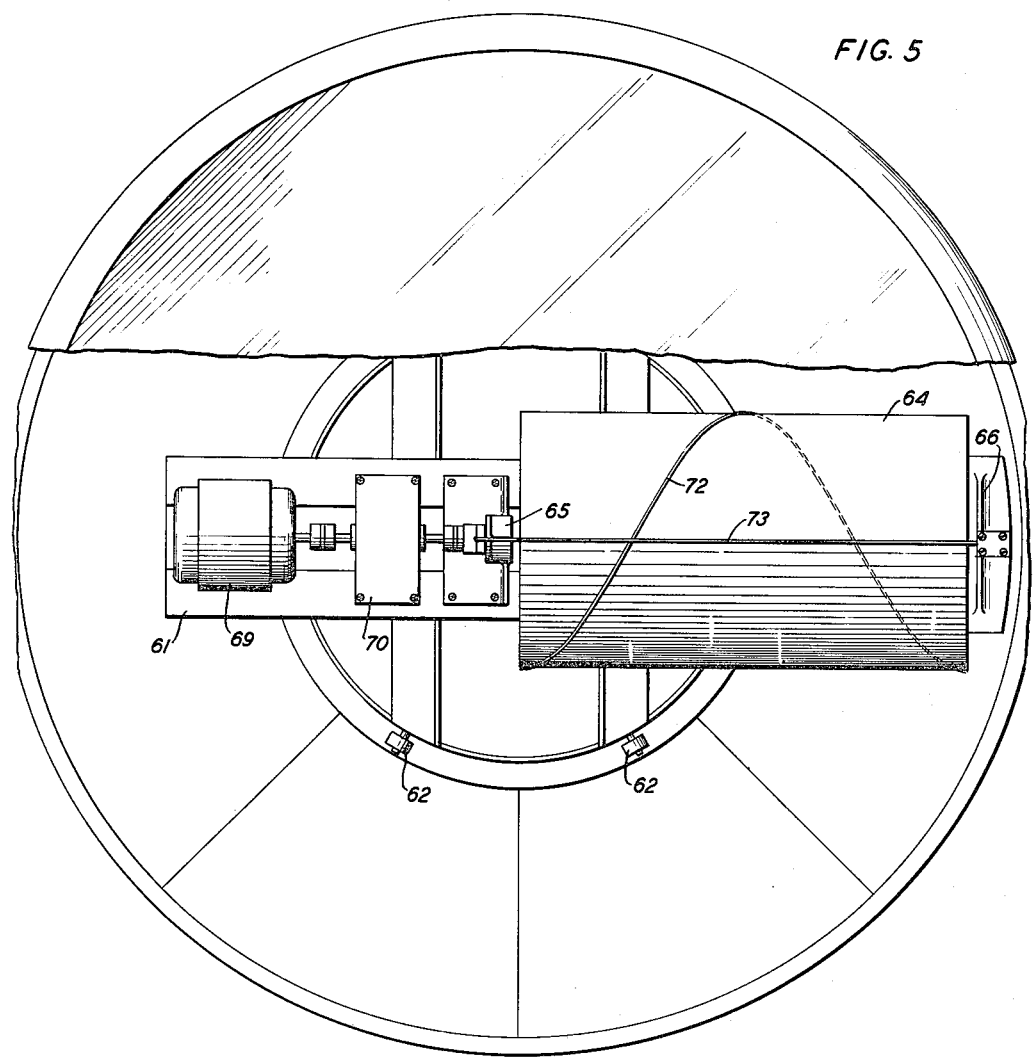

Fig. 3 is a perspective view of a plotting table such as may be used in the system of the invention; and Figs. 4, 5 and 6 are views showing the general structural arrangement of a plotting table of the type illustrated in perspective in Fig. 3, but showing certain modifications in the scanning elements over those represented schematically in Fig. 1, Fig. 4 showing the structure in sectional elevation, Fig. 5 in top plan, and Fig. 6 being a large scale section of one of the details.

Referring more particularly to the drawings, the object location system as schematically represented in Fig. 1 shows a preferred one of the forms in which the principles of the present invention may be embodied. Portions of the system which represent elements that are well known and commonly employed in the art are represented in block schematic form. In the arrangement of Fig. 1, power is furnished by the source of power supply 11 to the pulse modulator 12, which is connected by way of the radio transmitter 13 and a TR box 14 to the antenna 17. The pulse modulator 12 produces pulses at any suitable periodicity, such, for example, as 400 per second, each pulse having a length of from one or a fraction to ten microseconds. These pulses are modulated by a suitable ultra-high frequency carrier and are transmitted by way of the radio transmitter 13, TR box 14 and antenna 17. By way of example, the pulse modulator 12 can comprise an oscillator for providing a sine wave having a suitable periodicity. This oscillator energizes a pulse generator of any one of several suitable types well known to the art; for example, that disclosed in United States Patent 2,117,752, issued May 7, 1938 to L. R. Wrathall, which provides an energy pulse at a particular point of each cycle of the input wave supplied to it. The pulses from the pulse generator, modulated by the ultra-high frequency carrier, are applied by way of the TR box 14 to the antenna 17, which serves both as a transmitting antenna and as a receiving antenna to receive waves reflected from one or more objects within the range of the transmitted pulses. The antenna 17 may be of any suitable type, for example, the polystyrene "polyrod" type disclosed in an application of G. E. Mueller, Serial No. 469,284, filed December 17, 1942, now Patent 2,425,336 issued August 12, 1947. The reflected waves picked up by the antenna 17 pass by way of the TR box 14 to the radio receiver 15.

The TR box 14, or transmit-receive box, may be of any desirable type, for example, the type employing a Western Electric Company 709A tube. This tube is essentially a gas discharge protective tube mounted in and forming part of an electrically resonant cavity in electrical communication with the interior of the coaxial transmission line leading to the transmitting and receiving antenna 17. During reception of the low voltages of received energy the gas of the tube is not ionized, the cavity is tuned to electrical resonance with the signal, and the received energy passes through to the radio receiver. During the emission of a pulse from the transmitter the high voltage due to the pulse ionizes the gas in the tube, thus detuning the resonant cavity and preventing any substantial part of the energy of the pulse from reaching the radio receiver.

The reflection or echo waves, after amplification and detection in the radio receiver 15, are applied together with a sweep voltage from the sweep circuit 16 to the cathode ray or electron beam tube 19. In order that there may be discrimination against random disturbances of relatively large magnitude and in favor of the reflected target signals, the radio receiver 15 preferably includes a clipper or amplitude-limiting device, such as that disclosed in an application of D. Mitchell, Serial No. 464,271, filed November 2, 1942, now Patent 2,395,575 issued February 26, 1946, for limiting the intensity of all voltage variations to that of the maximum signal desired. By way of example, the clipper will remove all voltage variations of greater magnitude than that of the strongest echo.

The sweep voltage is a sweep wave of saw-tooth form produced, for example, by a sweep circuit such as disclosed in Patent 2,178,464, issued October 31, 1939 to M. W. Baldwin, Jr. Pulses from the pulse generator and modulator 12 are communicated to sweep circuit 16 to initiate each of the sweep waves so that the electron beam in the cathode ray tube 19 starts sweep cycles synchronously with the transmission of pulses. If desired, by the use of well-known variable delay means, the sweep wave can be initiated a predetermined short interval after the transmission of each of the pulses to the antenna 17.

The cathode ray tube 19 is one of the elements of the cumulator, which together perform the functions of receiving, distributing in order, and storing, the target echoes or received signals at the video frequency rate at which they are received from the scanning antenna, and subsequently reducing them to an audio frequency rate at which they are transmitted by audio frequency circuits to the distant plotting board or table. The cathode ray or electron beam tube 19 may conveniently be of the general type of the tube 20 disclosed in United States patent to Gould and Mertz 2,451,484, October 19, 1948. Similarly to the tube 20 of the above-mentioned patent, the tube 19 of the present application comprises an evacuated container enclosing an extended series of collecting elements 20, an electron gun for generating, focussing and accelerating a beam of electrons of such velocity as to be capable of building up negative charges on the collecting elements, and a pair of electrostatic deflecting plates 21 for causing the beam of electrons to impinge upon each of the collecting elements 20 in turn. The electron beam generated by the electron gun is modulated by the video target signals or reflected impulses detected and amplified by the radio receiver 15. The electron gun may comprise a cathode 22, a control electrode 23 and accelerating anode members 24 and 25. The control electrode 23 is normally maintained at any suitable negative potential with respect to the potential of the cathode 22 by appropriate connection with the serially arranged resistance 26 connected across the terminals of the direct current power supply 27. The electron accelerating elements 24 and 25 are so connected with the resistance 26 as to give them appropriate positive potentials with respect to the cathode 22, the cathode being so connected as normally to have a positive potential with respect to the control element 23. The potential applied to the various electrode members and the location and shape of these members are such that the beam of focussed electrons impinges successively upon the elements 20 as it is moved under the influence of the deflection plates of the sweep circuit. These collecting elements 20 may, if desired, be treated with carbon so as to insure that the ratio of primary electrons striking each element to the number of secondary electrons leaving it is less than one.

Each of the elements 20 swept by the beam of electrons is connected through a parallel resistance member 28 and capacity member 29 to ground and the positive pole of the direct current power supply 27. The resistance 28 allows the charge imparted by the electron beam gradually to leak off, but the time constant of each circuit is longer than the time between successive pulses projected by the antenna 17. The charge accumulated at each of the elements 20 therefore is gradually built up by the series of received impulses from each target at the repetition rate of the transmitted pulses. Each of the collecting elements 20 of the cathode ray tube with its storing capacitance 29 and shunted resistance 28 is connected with a corresponding contact member on a commutator switch 30. These contact members are adapted to be successively engaged by a rotating switch arm 31. As each is passed over, the charge accumulated in the associated condenser is transmitted to the assemblage of elements designated as the plotter by way of a circuit that is schematically represented as passing through an amplifier and filter 32 and then through another amplifier 33. As will be explained later, these impulses pass from the cumulator to the plotter at a frequency rate very much lower than the frequency rate at which the rapidly repeated series of target signals pass from the antenna to the cathode ray tube of the cumulator. This reduction in transmission rate of the received target signals is such as to compress the video frequency band of transmitted signals into an audio frequency band that permits the use of an audio frequency transmission circuit of any desired length between cumulator and plotter.

At the plotting center where the information represented by the stored target signals is to be used, the signals are amplified by the amplifier 33, modulated in modulating oscillator 55, and delivered through slip ring and associated brush connections 34 to an ultra-violet lamp 35. The ultra-violet lamp 35 may conveniently be what is known as a "germicidal" lamp, a lamp which is generally like the commercial fluorescent lamps except that the tubular shell is made of a type of glass relatively transparent to ultra-violet light and does not have an interior fluorescent coating.

A suitable circuit for connecting the ultra-violet lamp 35 with the incoming circuit is schematically shown in Fig. 2. The transmission of the signal impulses through the lamp 35 is between the two filament electrodes 49 and 50 which are normally maintained heated to facilitate the discharge through the tube in response to the incoming signals. Preferably the tube electrodes would be of the equipotential heater type. The heating current is supplied by a source of current which is applied by way of brushes in engagement with slip rings 51 and 52 on the shaft carrying the rotating platform 40 of the plotter. The heating filaments 49 and 50 may be serially included in this circuit, as in the case of commercial fluorescent lamps.

The signal impulse is applied through the brush and slip ring 53 to the electrode 50, the energy of the impulse being prevented from being dissipated in the filament heating circuit by the interposition of high frequency choke coils 54 in the conductive paths extending from filament 50. The signal is preferably applied through the medium of a modulating oscillator 55, which may be part of the unit designated as 33 in Fig. 1, or may be in addition thereto. The unit 55 preferably generates a high frequency wave, say, one megacycle, which is modulated by the signals. The arrangement is preferably such that normally there is very little if any flow of oscillatory high frequency current through the lamp 35. Each incoming signal in effect triggers off the modulator oscillator to transmit a relatively large flow of high frequency current through the ultra-violet lamp circuit and cause corresponding ultra-violet radiation. To stabilize its operation and increase its efficiency the lamp 35 is preferably enclosed in a heat-insulating jacket provided with a slot to permit the passage of ultra-violet light through registering slots in the associated scanning elements.

The ultra-violet lamp 35 is mounted within a rotating cylindrical mask 36 having a narrow helical slot 36' extending in one convolution from approximately one end to approximately the other end of the mask (see Fig. 1A). The light from the lamp 35, after passing through the helical slot, is further restricted by a narrow linear slot in a mask 37. Thus the intersection of these two slots forms an aperture through which light is transmitted to a photo-luminescent or phosphorescent coating 38 on the lower surface of a transparent plotting table 39. For efficiently transmitting the ultra-violet light and defining the area of its impingement on the phosphorescent coating 38 there is preferably provided a long cylindrical lens 37', which may suitably be a quartz rod, carried in the linear slot in the mask 37. The positioning of the cylindrical mask 36, linear mask 37, ultra-violet lamp 35 and fluorescent coating 38 with respect to each other and the plotting table is such that the light which passes through the slot intersections is brought to an approximate focus on the phosphorescent under-surface 38 of the plotting table 39. The phosphorescent coating 38 is preferably of a material chosen to have a sufficiently long luminous persistence to permit the operator or operators attending the plotting table to mark each significant luminous target indication as it appears. The top of the table 39, in accordance with the usual practice, would normally carry a grid map of the area being scanned by the radar antenna, and the target signals of interest would be marked on this map directly above the corresponding luminous points produced on the phosphorescent surface by the automatic plotting elements.

The radial mask 37 together with the cylindrical mask 36 and its driving members are carried upon a platform 40 that is rotatable upon a vertical axis. The platform 40 is driven through speed reduction gearing 41 and differential gearing 42 by a synchronous motor 43. The cylindrical mask 36 is supported by bearings in standards carried by the rotatable platform 40, and is driven by the synchronous motor 44 through a speed reduction gear box 45 also carried by the platform.

The rotating platform 40 and the associated radial mask 37 are arranged to be driven in synchronism with the azimuthal sweep of the radar antenna 17, and the cylindrical mask 36 is arranged to be driven in synchronism with the range scanning rotation of the brush 31 of the cumulator commutator. The antenna 17 is rotated through speed reduction gearing by the synchronous motor 18, and the brush 31 of the cumulator commutator is rotated through speed reduction gearing and mechanical differential gearing 46 by the synchronous motor 47. The synchronous motors 43, 44, 18 and 47 all derive their alternating current power from the same source of supply, and therefore are maintained in operating synchronism with each other. By means of the mechanical differential 42 the azimuthal phase relation of the radially slotted mask 37 with the map of the exploratory area on the plotting table 39 is manually adjusted to correspondence with the azimuthal phase relation of the antenna 17 with the exploratory area itself, and by means of the mechanical differential 46 the point in the range scanning sweep of the cumulator that is being engaged at the moment by the cumulator commutator brush 31 is manually adjusted to correspondence with the corresponding point of intersection of the helical slot in cylindrical mask 36 with the radial slot in mask 37. Thus adjusted, the target indications on the map of the plotting board each appear at the point in azimuth and range on the map that corresponds with the actual location in azimuth and range of the object or target in the exploratory area being scanned.

Figs. 3, 4, 5 and 6 illustrate a plotting table adapted for use with the present invention, wherein the ultra-violet light for exciting phosphorescent target signal indications is generated in a different manner than that described above, and show in detail the mechanism of a plotting table such as that represented schematically in Fig. 1. The mechanical arrangement of the elements of the plotting table shown schematically in Fig. 1 may be substantially the same as corresponding elements of Figs. 4, 5 and 6. For the sake of clarity different reference characters than those employed in Fig. 1 will be used to designate the elements of the table of Figs. 3, 4, 5 and 6.

As represented in Fig. 3, the plotting table is of sufficiently large diameter, say four feet, to carry a map grid of the entire exploratory area on a conveniently large scale, and to be manned, if desired, by several operators. The top of the table may be a circular plate 56 of glass, provided on its lower surface with a phosphorescent or photoluminescent coating 57 and carrying on its upper surface a map grid 58 which may be of some such material as thin plexiglass. The plate glass is supported at its periphery by means of a drum-shaped housing 59 carried upon and supported by a cylindrical standard 60 of smaller diameter. Within the drum 59 and standard 60 are housed the various moving elements of the plotter. These comprise primarily a rotatable platform 61 supported by a plurality of running wheels or bearings 62 on a circular track 63, and a range scanning cylinder 64 rotating on a horizontal axis in bearings carried by upright brackets 65 and 66 mounted on the rotatable platform 61. The rotatable platform 61 is driven in synchronism with the azimuth sweep of the radar antenna by the synchronous motor 67 through the reduction gearing 68, and the cylinder 64 is driven in synchronism with the range sweep of the cumulator brush 31 by means of the synchronous motor 69 through the reduction gearing 70. The driving connection between motor 67 and reducing gears 68 preferably includes a mechanical differential (not shown), such as the mechanical differential 42 in Fig. 1, to adjust the azimuth position of the scanning elements on the rotatable platform 61 to exact phase with the scanning antenna. The electrical connections with the various elements carried by the rotatable platform 61 are made through the medium of the slip rings 71 and their associated contact brushes.

In the modified form of plotter shown in Figs. 3, 4, 5 and 6 the ultra-violet light for producing the signal indications on the phosphorescent coating 57 is generated by means of a spark produced between the two electrodes 72 and 73. The electrode 72 is a one-turn wire helix positioned on the outer surface of the range scanning cylinder 64, and the electrode 73 is a conductor, such as a tightly stretched wire, supported upon insulating abutments carried by the upright brackets 65 and 66 on the rotatable platform. The electrodes 72 and 73 may appropriately be of nickel. They are accurately positioned so as to remain just out of contact, or with a minimum practical air-gap between them, during the entire range scanning rotation of the cylinder 64. The target signal sparks may be produced and applied to the electrodes by circuits of the same nature as those described in connection with the plotter of Figs. 1 and 2.

Various expedients, known in the art but not illustrated herein, may be employed for limiting the effective spread of the light field of the ultraviolet radiation from the spark, and for focussing the radiation to as great an extent as possible upon a small area of the phosphorescent coating immediately above the spark. One such expedient known in the art, and mentioned in the description of Fig. 1, is a long cylindrical lens such as a quartz rod supported so as to lie directly above and parallel with the radial electrode 73. Another is a lenticular sheet of ultra-violet transmitting glass or plastic interposed between the phosphorescent coating 57 and the spark electrode 73, and preferably carried by the glass plotting table 56 in close contact with the phosphorescent coating 57. Such lenticular sheets are well known in the art and comprise a multiplicity of minute convex lenses pressed into the material of the sheet and serving to transmit light that is incident at a narrow angle and to prevent the transmission of light incident at a wider angle.

As in the form schematically illustrated in Fig. 1, the plotter shown in Figs. 3, 4, 5 and 6 is so arranged that the rotatable platform 61 is driven in synchronism and in phase with the sweep of the antenna and the cylinder 64 carried on the rotatable table is rotated in synchronism and phase with the range scanning rotation of the brush 31 of cumulator commutator 30. For each azimuth interval position of the radial electrode 73 there is one complete rotation of cylinder 64 which causes the point of sparking proximity between the one-turn helical electrode 72 and radial electrode 73 to sweep from one end to the other of the electrode 73. Therefore the position of sparking proximity between the two electrodes coincides at all times with the range sweep of the cumulator commutator brush. If it is assumed that the principal azimuth interval scanned by the antenna beam is one degree and that the range scanning cylinder makes one complete rotation for each azimuth scanning interval, the rate of rotation of the cylinder 64 is 360 times the rate of rotation of the platform 61 carrying the azimuth scanning element or electrode 73.

The operation of the illustrative embodiments of the invention as set forth in the foregoing will now be described. Let it be assumed, for example, that the maximum range to be scanned in the exploratory area is 200 miles. The distance of pulse travel and echo return from a 200-mile distant target is 400 miles. At a propagation rate of 186,000 miles per second, the time required for the return of the echo would be something less than $\frac{1}{400}$ of a second. A pulse repetition rate of 400 per second would therefore allow time for the echo to return from the most remote target before the next succeeding pulse is emitted. Let it be assumed that the entire radar azimuth sweep is divided into azimuth intervals of one degree and that the complete azimuth sweep requires 36 seconds, or $\frac{1}{10}$ second per degree. Under this assumption there would be a pulse emission of $\frac{1}{10}$ of 400 or 40 pulses for each azimuthal interval of one degree. Each target therefore would emit 40 reflections in the course of the principal azimuthal interval during which it is scanned, and the energy represented by the 40 reflections from each target during this interval would be received at the antenna 17 and transmitted with amplification through the radio receiver 15 to the cathode ray tube 19 of the cumulator.

As the sweep of the electron beam over the elements 20 of the tube is timed by the sweep circuit 16 and is initiated by each transmitted pulse, the reflected and amplified energy from each target would be applied to the intensity control grid 23 of the tube 19 at the same instant in each of the 40 assumed sweeps of the beam, and would therefore be repeatedly applied to the same element in the line or series of collecting elements 20. As the time constant with respect to leakage of the network consisting of resistance 28 and capacitance 29 connected with each of the elements 20 is longer than the time between successive pulses projected by the antenna 17, the charge accumulated by the network is gradually built up by the series of received echo impulses from the corresponding target. The electrical disturbances usually referred to as noise in the azimuthal interval being scanned are of random and not regularly repetitive occurrence, as contrasted with the rhythmic repetition rate of the target signals, and therefore such received noise energy is largely dissipated by leakage through the resistance of the associated network. Consequently, at the termination of the reflections from the assumed series of 40 pulses projected into a particular azimuthal interval of one degree, there exists a definite target range signal pattern upon the series of collecting elements 20 and their associated networks.

As it has been assumed that the projection of pulses into and reception of electrical echoes from each principal azimuthal interval takes place over a period of $\frac{1}{10}$ second, the connecting brush 31 of the cumulator commutator 30 is adjusted to rotate at the rate of one revolution every $\frac{1}{10}$ of a second. As the brush 31 rotates it successively engages the contact points of the commutator and whatever accumulated target signal charges are present, are removed and transmitted to the circuit extending to the plotter.

The degree of range accuracy in the area scanned depends upon the number of collecting elements 20 in the path of the electron beam in tube 19. If the extreme range scanned is 200 miles, as has been assumed, a range resolution between targets two miles apart would require a series of 100 collecting elements 20. As the commutator brush 31 in the present example has been assumed to rotate at the rate of 10 revolutions per second, the maximum frequency of transmission produced by a condition in which a stored target signal is present on every one of the points of the commutator 30 would be 1,000 impulses per second. This maximum frequency under the conditions assumed is well within the audio frequency transmission band. It represents a reduction in the frequency band width of forty to one, as compared with the frequency band width which would have to be transmitted in the absence of the cumulator which stores forty video frequency target signals for every one transmitted. As a result the transmission circuits between the cumulator and the plotter in the system of the present invention may be ordinary audio frequency circuits, easily permitting the wide separation, if desired, of the plotting board and information center from the radar transmitting and receiving apparatus.

Preferably before being applied to the audio frequency transmission line extending to the plotter, the target signals collected by the range sweep of the cumulator commutator are amplified and filtered in the amplifier and filter unit 32. The filtering element of this unit may be a low-pass band filter designed to pass the band of target signal frequencies, which in the present example is assumed to have a maximum breadth of 1,000 cycles, and to suppress higher frequency components due to random disturbances and other causes. It will be understood that under other operating conditions than those arbitrarily assumed in connection with the present illustrative example—conditions where the audio signal frequency band is less compressed and has a greater breadth, say as much as 3,000 cycles or more—the low-pass filter element of the device 32 will be designed to accommodate the greater band width.

After passing through the device 32, the amplified and filtered band of target signal frequencies passes over the audio frequency transmission line 48 to the plotter, being further amplified and modulated, if desired, in the amplifier 33 and modulating oscillator 55 associated with the plotter. As has been indicated, the reduction of the target signals to an audio frequency band width permits the transmission line 48 conveniently to be made as long as may be necessary to transmit the signals to a remote information and plotting center.

What is claimed is:

1. In a system for automatically making visible in a plotting table the positions in azimuth and range of objects lying in an exploratory area, means for receiving at a video frequency rate reflected energy from each object, means for compressing the band width of the video frequency reflected energy and transmitting the same to the plotting table at an audio frequency rate, means for translating the audio frequency energy impulses into ultra-violet light, and means for using said ultra-violet light to produce automatically on the plotting table a phosphorescent signal indication corresponding in azimuth and range with the position of each object from which video frequency reflected energy has been received.

2. In a system for automatically making visible on a remotely located plotting table the positions of objects lying in an exploratory area, means for receiving at a video frequency rate reflected energy from each object, means for cumulating the energy reflected from each object and for transmitting to the plotting table at an audio frequency rate the cumulated energy reflected from each object, means for translating the cumulated energy corresponding to each object into ultra-violet light, and means using the ultra-violet light thus produced to excite phosphoresence at a point on the plotting table corresponding to the position of the object in the exploratory area.

3. In an object location system, a scanning antenna rotating in azimuth and having associated means for projecting a series of energy pulses into sequentially scanned portions of an exploratory area and receiving reflected energy impulses from objects lying in each portion as it is scanned, range scanning means for receiving and distributing reflected energy impulses in accordance with the elapsed time interval between each pulse and each reflected impulse, a plotting surface, a radially slotted mask rotating beneath said surface with its radial slot in synchronism and phase with the azimuth rotation of said scanning antenna, a helically slotted cylindrical mask rotating with its helical slot in synchronism and phase with the movement of said range scanning means, a source of light arranged within said cylindrical mask and lying along and parallel with said radial slot, and means controlled by the distributed reflected energy from each of the objects to energize said light source to cause light to pass through the point of intersection of said slots and fall upon the particular point on said plotting surface corresponding in azimuth and range with each object from which reflected energy is received.

4. In an object location system, a scanning antenna rotating in azimuth and having associated means for projecting a series of energy pulses into sequentially scanned portions of an exploratory area and receiving reflected energy impulses from objects lying in each portion as it is scanned, range scanning means for receiving and distributing the energy of said reflected impulses in accordance with the elapsed time interval between each projected pulse and each of the reflected impulses, a plotting table having a photoluminescent surface, a radially slotted mask, means for causing said mask to rotate with its radial slot in synchronism and phase with the azimuth rotation of said scanning means, an associated helically slotted cylindrical mask, means for causing said cylindrical mask to rotate in synchronism and phase with the movement of said range scanning means, a source of ultraviolet light, means controlled by the distributed reflected energy from the various objects scanned to energize said light source, mounting means for said rotating masks whereby their slots variably intersect as in accordance with the rotations of said masks, and means adapting said energizing means to cause light to pass through the points of intersection of said slots and fall upon the particular point on said plotting surface corresponding in azimuth and range with each object from which reflected energy is received.

5. In an object location system, a scanning antenna rotating in azimuth and having associated means for projecting a series of energy pulses into sequentially scanned portions of an exploratory area and receiving reflected energy impulses from objects lying in each portion as it is scanned, range scanning means for receiving and distributing the energy of said reflected impulses in accordance with the elapsed time interval between each projected pulse and each of the reflected impulses, a photoluminescent plotting surface, a radial scanning member, means for causing said member to rotate in synchronism and phase with said scanning antenna, a helical scanning member, means for causing said helical member to rotate in sychronism and phase with the movement of said range scanning means, means for producing and transmitting ultra-violet light to said photoluminescent surface at the point of intersection of said radial and helical scanning members, and means controlled by the distributed reflected energy from the various objects scanned for controlling the projection and transmission of said ultra-violet light, said light being transmitted to the particular point on said photoluminescent surface corresponding in azimuth and range with the corresponding object from which the reflected energy is received.

6. A large scale automatic plotter, comprising a plotting table, a source of light, modulating means therefor responsive to energy impulses to be plotted, and means for sequentially directing the modulating light to different circumferential and radial portions of said plotting table to produce luminous indications thereon, said means comprising a radially extending light-positioning element adapted to be continuously driven to position the light circumferentially on the plotting table and a cooperating helical light-positioning element adapted to be continuously driven to position the light radially upon the plotting table, the distribution of the luminous indications over the surface of the table being determined by the time distribution of the light modulating energy impulses.

WILLIAM C. TINUS.

REFERENCES CITED

The following references are of record in the file of this patent:

UNITED STATES PATENTS

| Number | Name | Date |
|---|---|---|
| 1,859,828 | Jenkins | May 24, 1932 |
| 1,862,455 | Barnecut | June 7, 1932 |
| 1,924,174 | Wolf | Aug. 29, 1933 |
| 1,945,968 | Amicis | Feb. 6, 1934 |
| 2,403,562 | Smith | July 9, 1946 |
| 2,406,751 | Emerson | Sept. 3, 1946 |
| 2,412,669 | Bedford | Dec. 17, 1946 |
| 2,412,670 | Epstein | Dec. 17, 1946 |
| 2,422,295 | Eaton | June 17, 1947 |
| 2,430,038 | Wertz | Nov. 4, 1947 |
| 2,430,283 | Epstein | Nov. 4, 1947 |
| 2,479,569 | Harschel | Aug. 23, 1949 |
| 2,491,450 | Holmes | Dec. 13, 1949 |
| 2,524,837 | Russell et al. | Oct. 10, 1950 |

FOREIGN PATENTS

| Number | Country | Date |
|---|---|---|
| 542,634 | Great Britain | Jan. 21, 1922 |
| 520,778 | Great Britain | May 3, 1940 |